US006249591B1

(12) United States Patent
Tullis

(10) Patent No.: US 6,249,591 B1
(45) Date of Patent: *Jun. 19, 2001

(54) METHOD AND APPARATUS FOR CONTROL OF ROBOTIC GRIP OR FOR ACTIVATING CONTRAST-BASED NAVIGATION

(75) Inventor: Barclay J. Tullis, Palo alto, CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,892

(22) Filed: Aug. 25, 1997

(51) Int. Cl.⁷ ........................................... G06K 9/00
(52) U.S. Cl. ..................... 382/106; 382/153; 356/376
(58) Field of Search .................................. 382/106, 153, 382/316, 152, 151; 356/375, 376, 3.01, 3.1, 3.11, 3.12, 4.01, 4.07, 4.09, 5; 250/227.2, 208.1

(56) References Cited

U.S. PATENT DOCUMENTS

| | | | |
|---|---|---|---|
| 4,479,053 | * | 10/1984 | Johnston ............................. 250/221 |
| 4,629,324 | * | 12/1986 | Stern ................................... 356/376 |
| 4,687,325 | * | 8/1987 | Corby, Jr. ................................ 356/1 |
| 4,766,322 | * | 8/1988 | Hashmoto .............................. 901/35 |
| 5,578,813 | * | 11/1996 | Allen et al. ........................ 250/208.1 |
| 5,608,818 | * | 3/1997 | Chini et al. ............................ 382/153 |
| 5,726,443 | * | 3/1998 | Immega et al. .................... 250/227.2 |

FOREIGN PATENT DOCUMENTS

| | | | |
|---|---|---|---|
| 43 39 710 | * | 11/1993 | (DE) .............................. G01B/11/14 |
| 0 730 366 | * | 9/1996 | (EP) .............................. H04N/11/07 |

OTHER PUBLICATIONS

European Search Report, Application No. EP 98 30 6503, dated Jul. 1, 1999.*

* cited by examiner

Primary Examiner—Amelia Au
Assistant Examiner—Jingge Wu

(57) ABSTRACT

A sensing device and method for determining the proximity and lateral movement of a second object relative to a first object. To determine proximity and lateral movement, the second object is illuminated to create light contrasts on that second object that correspond to unique structural and/or printed features of that second object. Light contrast data is compared to reference data to determine proximity and lateral movement of the second object relative to the first object. The invention typically utilizes an illumination source, imaging optics, and a sensor array mounted to the first object. This invention can be used in the end-effectors of a robotic arm to manage handling of a payload. It can also be used as a contact sensor to gate the operation of a manual scanning device when the scanner is brought into contact with the surface of a document.

19 Claims, 8 Drawing Sheets

METHOD AND APPARATUS FOR CONTROL OF ROBOTIC GRIP OR FOR ACTIVATING CONTRAST-BASED NAVIGATION

TECHNICAL FIELD

This invention relates to an optical sensing system and more particularly to an optical sensing system that can sense proximity, surface contact, and lateral movement of one object relative to another object.

BACKGROUND ART

Distance from a known object to a target object can be measured in many non-contacting ways. Electromagnetic energy is used for RADAR data, acoustical energy is used for SONAR data, and light is used for LIDAR data. RADAR uses radio waves, SONAR uses acoustical waves, and LIDAR uses light waves. These three distance determining techniques rely on time-of-flight measurements to determine distance. Other techniques include the use of structured light, interferometry, and various vision systems. Also, conventional force and pressure sensors can be used. Another technique uses the measurement of back-pressure from a gas jet impinging on the surface of the object being sensed.

One structured-light method for determining distance between two non-contacting objects, i.e., proximity between two objects, is described in U.S. Pat. No. 4,479,053, entitled "Focal Plane Array Optical Proximity Sensor," to Johnston. An optical system mounted in a first object senses the relative position of a surface of a second object. This optical proximity sensor works by utilizing the intersection of an illuminated light field with a light-detecting field-of-view to define a detection volume. Light reflected from the surface of an object in the detection volume is sensed by a photodiode and indicates that an object is within the volume defined by the intersecting fields. The light emitters in Johnston are light-emitting diodes, and the light detectors are photodiodes. There is a photodiode for each light-emitting diode, and each photodiode is located on the image plane of a lens whose conjugate object plane intersects the aforementioned intersection volume. By appropriately positioning each light-emitting diode/photodiode pair on its respective focal plane, and appropriately positioning the lens assemblies with respect to each other, any desired volume can be defined in which an object is to be detected.

Another method using structured light for determining the distance between two non-contacting objects is described in U.S. Pat. No. 4,687,325, entitled "Three Dimensional Range Camera," to Corby, Jr. A pattern generator and projector on the first object produce a 1 N array of time/space coded light rays whose intensities can be varied with time, and projects P sequential presentations of different subsets of the light rays onto the second object, where P=1+logbN, where b is the number of brightness levels, and where N is the number of rays. The light rays are projected onto the second object along a direction which is not coaxial with the optical axis of an imaging device. A linear sensor such as a line scan camera images the points of light where rays are incident on the surface of the second object and generates one-dimensional scan signals which have ray-associated peaks at locations corresponding to imaged light. A high speed range processor analyzes the one-dimensional waveforms to uniquely identify all rays, determines depth from the displacement of the ray peaks from their zero-height reference-plane peaks, and provides output range data. To create two-dimensional range maps, a means such as a rotating mirror is provided for orthogonally sweeping the 1N coded light rays by steps over a rectangular plane.

While these structured-light methods work well for their intended purposes, they are not able to sense contact with another object. Force and pressure sensors however can be used to measure contact between two objects, but cannot sense proximity between the two objects unless there is actual contact. As well, proximity sensors and contact sensors are not necessarily well suited to sense lateral displacement between the sensor on the first object and the target surface on the second object when the sensor-to-target separation is small.

What is needed is a method and system for sensing close proximity of one object to another, touch or contact between two objects, and lateral movement or "slip" between two objects in contact or nearly in contact with one-another.

SUMMARY OF THE INVENTION

The invention is a sensing device and method that can determine the proximity and lateral movement of a second object relative to a first object by illuminating a surface of the second object to create light contrasts that correspond to unique structural or printed features of the surface of that second object. Sensors mounted with the illumination device on or in the first object then compare the light contrast data of the illuminated surface of the second object to some reference data to determine relative proximity and lateral movement information.

Key components of the invention are illumination, imaging optics, and a sensor array. Illumination is necessary to create light contrasts on the second object of interest that are indicative of structural or printed features of the surface of that object. The imaging optics collect and focus light power and by integrating the collected power over sampling intervals of time, the sensor array converts integrated power samples into electrical signals.

Light contrasts can be used as landmarks for position determination since the surfaces of most objects have unique optical or structural features or printed features that interact with light to produce unique contrast patterns. To create light contrasts, conventional light sources such as light-emitting diodes may be used. There are different techniques for illuminating the object of interest that can be used to maximize contrast values. In some instances, often when a surface exhibits glossy or mirror-like properties, light should be delivered from a direction normal to the object of interest. In other instances, often when a surface exhibits diffuse light-scattering properties, light impacting the object of interest at an angle helps to create the best light contrasts.

An imaging lens or series of imaging lenses are used to image light contrasts exhibited at the surface of the second object onto the sensor array by collecting light that is reflected or scattered from a surface portion on the second object. The magnification of the imaging lens(es) is chosen such as to scale the feature sizes appropriately to enable the sensor array to adequately resolve their uniqueness.

In addition, telecentric lenses can be used so that small proximity changes near a contact point will not change the effective magnification of the lens. A variable iris may also be used with the imaging lens to enable varying the numerical aperture and thereby varying the depth-of-field over which contrasts remain high near the plane of contact. Similarly, a zoom lens may be used to enable accurate proximity measurements at much greater distances away from a plane of contact.

The sensor is an array of discrete optically sensitive elements. The spacing of the elements affects the resolution of the images that the sensor array can produce with any fixed imaging magnification. The sensor array can be a charged-coupled device, an amorphous silicon photodiode array, or an array of active pixels.

The typical sensing device consists of an illumination source, imaging optics, and a sensor array which are usually mounted or secured to a base in or on the first object that may contain processing electronics and other structural features.

The imaging optics are attached such that the image plane is at the sensor array when the object plane is tangent to the contacting surfaces of the first and second objects. The sensor array creates an electronic image when its pixel sensing elements receive light imaged from the plane of contact. The illumination source is located such that light can impact the surface of a second object, the object of interest, at the desired angle, when the surface of that object of interest is in proximity to contact or actually in contact with the first object. The illumination source may be fixed, or it may be movable so that it can adjust the angle of incidence as needed.

The first step in determining contact or proximity information is to fix a sensor device to the first object, to bring the first and second objects into contact, and to illuminate the contacted surface of the second object. Then a contact-reference image is acquired by the photosensor device and used as contact-reference data. The contact-reference data, which is the reference image while the objects are in contact, is also referred to as contact-calibration data.

The contact-reference data is typically a distribution of light intensity that is reflected/scattered from a surface of an object of interest. The contact-reference data will have characteristics of relatively high image resolution, relatively high image contrast, and relatively high intensity. That is, the resolution, contrast, and intensity of light delivered to the sensor while the sensor is in focus on the surface of the object of interest are all higher than when the object of interest is not in contact with the first object.

Additional reference data, called proximity-reference data, may be obtained while the object of interest is positioned at various points of separation from contact with the first object, i.e. while the object of interest is only in various degrees of proximity to contacting the first object. Relative to the contact-reference data, the resolution, contrast, and intensity of the proximity-reference data all decrease the farther away from contact the two objects are separated. The decreases in these values with increasing distance are non-linear, assuming the illumination is optimized to be brightest and to create the best image contrasts when the two objects are in contact.

Once the reference data has been developed, the sensor device can determine the position of the object of interest relative to the first object. The position of the object of interest at a certain point is determined by comparing the image data to the reference data. Comparison of the data consists of mathematical calculations which compare the known reference data to the image data. In the preferred embodiment, the mathematical calculations may include using a Fourier transform to compare the image data to the reference data.

The position proximal or contact positions of the object surface of interest to the first object are then determined by comparing the resolutions, contrasts, and intensities of the measured image data with the contact-reference and proximity-reference data. Rates of approach or separation can then be determined also. The most accurate position determination can be made by comparing the contrast data and/or the resolution data when the two objects are in contact or very near to contacting one another, while the intensity (or energy) data is best at greater distances of separation.

To determine the lateral movement of an object of interest relative to a first object, a sequence of at least two image data frames must be captured by the sensor device. The sequence of image data that is captured may be the same image data that is captured for the proximity determination or it may be separate data.

Lateral movement determination includes correlating successive frames of image data. The correlations compare the positions of unique structural or printed features in a sequence of image frames to provide information related to the position of a second object relative to a first object at a particular time. In a first step, a reference frame is acquired, using the sensor device, that corresponds to a position of the second object. In effect, the reference frame is a start position. Next, a sample frame is acquired that corresponds to the object of interest at a later time. The later time is usually an interval that is short enough to allow the image to move no more than one pixel per time interval. This minimizes the search space of the correlation calculations, and also maximizes response time.

Comparing the position of unique light contrast patterns in the reference frame to the position of the same light contrast patterns in the sample frame gives an indication of relative movement between the object of interest and the first object. Comparing the reference frame to the sample frame is accomplished by first utilizing the reference frame to establish a series of templates that indicate all of the possible directions of movement that the reference frame could make, including no movement at all. The sample frame is then compared to each of the templates and correlation values are calculated. The correlation values represent the degree of similarity between each template and the sample frame. The highest degree of correlation between the series of templates and the sample frame gives the indication of the actual relative movement between the object of interest and the first object.

Preferred embodiments of the invention include integrating the sensor device into a robotic arm and using the sensor to activate or deactivate a hand scanner. As applied to a robotic arm, the invention may operate in conjunction with other known proximity sensing systems to provide sensitivities analogous to that of human touch. The known proximity sensing systems are typically used to guide a desired object to within the working range of the invention. At least one sensor device is fixed to end-effectors or "fingers" of a robotic arm. As the arm attempts to grab a payload that is within the working range of the invention, the proximity determination mode of the sensor device guides the robotic arm and end-effectors towards contact with the payload. As the end-effectors approach the payload, the sensor device creates light contrasts on the surface of the payload. Utilizing the method described above, the sensor device determines the relative distance of the sensor device, and thus the end-effectors, to the payload. The relative distance is calculated continually at time intervals that can be in the micro-second range. Utilizing the change in relative distance traveled per period of time, the rate of approach can easily be determined. The rate of approach may be precisely adjusted as the end-effectors near and eventually contact the payload. Upon contact, the end-effectors grab the payload with sufficient force to perform the desired operations.

The sensor device or multiple sensor devices are located on the end-effectors such that the sensor devices can illuminate the surface of the payload when the payload is either in proximity to or engaged by the end-effectors. In sensing the light contrasts from the surface of the payload, and in correlating these to determine relative lateral movements, the sensor can monitor for any movement between the end-effectors and the payload. Movement between the end-effectors and the payload may indicate that the payload is not securely held by the end-effectors and is effectively "slipping" through the robot's fingers. To control slippage, the robotic arm is programmed to adjust the force of its grip in response to relative movement between the end-effectors and the payload. For example, if the robotic arm is holding a payload and the payload starts to slip, the sensor device will detect the relative movement and adjust the grip pressure as needed to control the slip.

The lateral movement and proximity detection may also be used to release the payload and separate the end-effectors from the payload. Also, by employing more than one sensor to measure slippage amounts and rates at different points of contact between end-effectors and a payload, the direction of relative motion in both translation and rotation can be measured and gravity can therefore be usefully employed to help move and rotate the payload in desired directions.

In another embodiment, the invention may be used to activate or deactivate certain operations in a hand scanner. For example, the invention may be used as an ON/OFF controller in a hand scanner. In this embodiment, two sensor devices are located on the image detection side of the scanner. The sensor devices, in a "powered down" mode, periodically pulse their illumination systems searching for the presence of a surface. The sensors will only power up if or when sufficient conditions are present. Sufficient conditions are present when the proximity mode of the sensor devices detects sufficient contrast in the image of a nearby surface. For example, if the hand scanner is lying on its side in a powered down state, when the sensors pulse their illumination systems, the sensors may not see any significant contrast or patterns characteristic of a surface image. If the only object in the path of the sensors is a distant computer on the desk or a wall on the other side of the room, the sensors will not recognize sufficient contrast and will not turn on. On the other hand, if the hand scanner is placed into position on a document, when the sensor devices pulse their illumination systems they will sense sufficient contrast and will come into full operation and direct the hand scanner to power up. The reverse process is used for powering down a hand scanner. Once the sensor device does not sense sufficient contrast, it turns off the scanner and goes into the periodic illumination mode. Also, if the sensor device does not detect sufficient lateral motion over a given period of time, it can shut down a hand scanner. The shut-down features can prevent excessive loss of battery power when a scanner is not in use but the manual power switch has been left turned on or inadvertently turned on while stored in a briefcase.

The lateral movement sensor function can be used independently or in tandem with the proximity sensor function to achieve ON/OFF control. Used in tandem, the sensors and hand scanner is turned on any time there is sufficient contrast created by a document and there is an indication of lateral movement. Or the two functions can be used in tandem another way. When the proximity sensor determines that there is sufficient contrast, the hand scanner is elevated from a powered down mode to an idle mode. Once lateral movement is sensed, the scanner is switched from an idle mode into a full operation mode.

Used alone, as an ON/OFF controller, the lateral movement sensor function periodically pulses the illumination system and senses for lateral movement, turning on the sensors and scanner upon detection of sufficient lateral movement. As well, when sufficient lateral movement is not detected the sensors and hand scanner are put into an idle mode or turned off. The lateral movement sensor function can also be programmed to turn off the scanner when the scanner speed across a surface falls below or exceeds specification limits of the scanner.

Utilizing the invention to activate or deactivate a hand scanner provides various advantages. The invention eliminates the need for pressing a button upon starting or stopping a scanning operation. In addition, the invention prevents the scanner from being accidentally turned on thereby unnecessarily draining its batteries.

Another embodiment of the invention is in automated handling of delicate parts. For example, integrated circuits that must be handled with care can be handled by a system with proximity and lateral movement sensors. With the proper optics, sensor systems with high accuracies on the order of whole or fractions of a micron can be obtained. In an assembly line type operation where the proximity sensor mode is employed to handle multiple units of the same part, reference data can be established based on average structural or printed features and corresponding light contrast for a particular line of parts.

DETAILED DESCRIPTION

Figure 1:
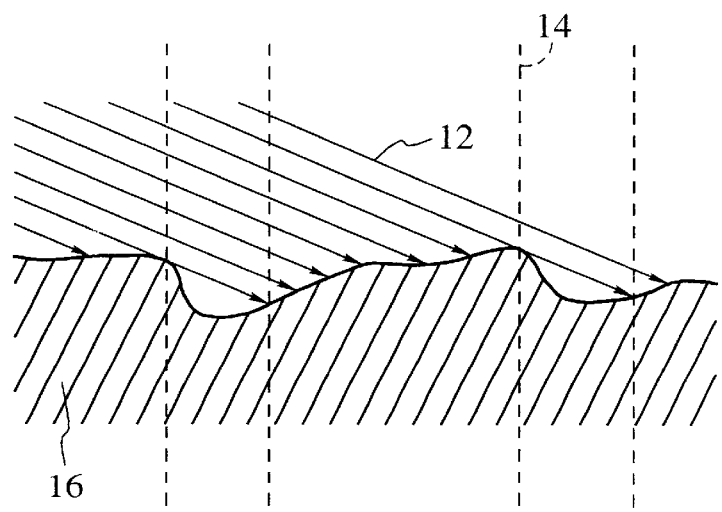
FIG. 1 is a depiction of a light impacting the surface of an object at an angle.

The purpose of illuminating the object of interest is to create light contrasts on the surface of the object of interest that are indicative of the structural and/or printed features of the object of interest. The light contrasts are used as landmarks for position determination, as discussed below.

Light contrasts are used to determine position information because many objects have unique structural and/or printed features that create unique light contrast patterns. For example, the payload in a space craft will have unique features on the outside of the payload. The structural features may be support frames or utility boxes. Light shining on these features creates a unique contrast pattern. At a smaller level, the same payload may be made of metal or another material which has fine texturing in its surface. Light shining on the surface will create a contrast pattern that corresponds to the fine texturing. Or the object could be, for instance, an egg where its shell has a unique texture on the outside. As well, the object could be a poster board made of wood or a document made of paper. Both wood and paper have fibers which create unique patterns when properly illuminated. Microscopic features, in paper products, that can be used to create light contrasts typically range from 10 $\mu$m to 40 $\mu$m in size. Other sources of contrasts that can be used include surface markings such as printing or color. Surface markings can be specially designed to achieve high image contrast to improve the performance of proximity and lateral motion measurements.

Contrast created on and imaged from a surface is a function of both the angle(s) of incidence of the light illuminating the surface and of the angles of viewing by the surface-imaging optics which collect and deliver the image to the photosensors of the sensor. This viewing angle can be defined as the angle between the surface normal and the optical axis of the viewing lens. In most circumstances it is best to position the viewing angle at approximately zero degrees.

To create light contrasts, conventional light sources are appropriate. For example, a linear array of high intensity light-emitting diodes having an amber color may be used. The selection of the preferred illumination source and its angle of incidence on the surface of interest is dependent upon the structural or printed features of the object of interest. The wavelength or color of light is selected to maximize the contrasts when the light is projected onto the object of interest. Illumination optics may consist of one or more LED's with dome lenses or may include a light pipe consisting of a molded optical element designed to channel the illumination onto the object of interest with a minimal amount of light loss. Such a design can afford relatively uniform illumination of a target area on the object of interest with a wide range of incidence angles, while blocking normally incident rays in order to avoid specular surface reflections.

Coherent light from a laser can be used if the surface of interest is not translucent enough to result in multiple scattering. Multiple scattering from scattering centers lying at multiple depths in the surface of interest can result in "boiling" of speckle patterns seen in the surface image as the relative position of the surface changes with time. But even on a non-translucent surface of interest, such as an aluminum surface, the deduction of object motion from pattern motion can be complicated by the specifics of the geometry of illumination, viewing, and relative motions involved. Therefore, incoherent illumination is the preferred illumination. For surfaces of interest exhibiting a surface profile or variations in material index-of-refraction, collimated light is preferred. Collimated light is light that consists of light that travels in the same or parallel direction and therefore creates good definition of surface profile shadows, i.e., good contrast. For surfaces with printed markings but little surface profile, non-parallel light is preferred because contrast is more a result of light scattering and absorption effects which do not much depend on the divergence or convergence within the incident illumination.

There are different methods of illuminating an object of interest that can be used to create the desired light contrasts. In some instances, light can be delivered from a direction normal to the object of interest. In other instances, as depicted in FIG. 1, light 12 impacting the object of interest at an angle helps to create the best light contrast given the structural features 14 of the object of interest.

For example, in the hand scanner embodiment that is discussed below, the selection of the angle of incidence depends upon the material properties of the object of interest, typically a document of some type. Grazing angles of illumination generate darker and longer shadows and more apparent contrast, or AC/DC signal, if the surface of the object of interest is not too glossy. The DC signal level, however, decreases as the illumination angle approaches ninety degrees from the normal to the object of interest, i.e. the grazing angle approaches zero degrees.

Illuminating the desired region of the object of interest at a grazing angle works well for applications in which the surface of the object of interest has a high degree of unevenness at the microscopic level. For example, the introduction of light from the source at a grazing angle provides image patterns with a high signal-to-noise ratio (high contrast) related to unique structural features when the object of interest is paper, cardboard, fabric, or human skin. On the other hand, in applications in which position data is needed to track scanner movement along such glossy objects of interest as photographs, magazine covers, and overhead transparency films, where surface profiles are minimal, it is preferable to use incoherent light at or near normal incidence. With at or near normal-incidence illumination, viewing the object of interest in the specularly reflected field will provide an image that is sufficiently rich in texture content to allow image and correlation-based position determination. The surface of the object of interest, in such cases, reflects light as if the surface were a mosaic of tiles, or facets. Many of the "tiles" of such a surface of interest reflect light in directions perturbed from the normal, such that an image of that surface will consist of bright and dark facets. Modeling a surface composed of facets is discussed by W. W. Barkas in an article entitled "Analysis of Light Scattered from a Surface of Low Gloss into Its Specular and Diffuse Components," in Proc. Phys. Soc., Vol. 51, pages 274–292 (1939).

As an alternative to illuminating the desired region of the object of interest using an external illumination source, the object of interest may be self illuminating or may have an internal illumination source. For example, the object of interest, also known as the second object, may have an internal light source built into the object which is capable of creating light contrasts without the need of an external illumination source.

Optical devices are used to collect and focus light energy that is present. An imaging lens or a series of imaging lenses collects light that is emitted from the illuminated object of interest and focuses it on a sensor array. The distances from the lens to the object of interest and from the lens to the photosensor array will depend on the lens chosen for the particular application and on the magnification desired. For some applications, such as hand scanning, the distance from the lens to the object of interest may be in the millimeter range. Contact imaging in hand scanning applications typically employ lenses sold under the trademark SELFOC, which is a federally registered mark of Nippon. In other applications, such as a robotic arm handling a payload, the focal distance from the lens to the object of interest may also be in the millimeter range but could also be greater.

In addition, telecentric lenses can be used so that small proximity changes near a contact point will not change the effective magnification of the lens. A variable iris may also be used with the imaging lens to enable varying the numerical aperture and thereby varying the depth-of-field over which contrasts remain high near the plane of contact. Similarly, a zoom lens may be used to enable accurate proximity measurements at much greater distances away from a plane of contact.

The sensor is an array of discrete optically sensitive elements. The spacing of the discrete optically sensitive elements affects the resolution of the image that the sensor array can produce. The sensor array can be a charged coupled device, an amorphous silicon photodiode array, or another type of active pixel sensor array. In the hand scanning application, the sensor array may be the HP Magellan chip.

Processing electronics and/or software may also be necessary to interpret and transfer relevant data. The electronics may include electronic or magnetic memory, microprocessors, ASICs, DSPs, and cables. The software may include operating systems, applications, and database systems.

Figure 4:
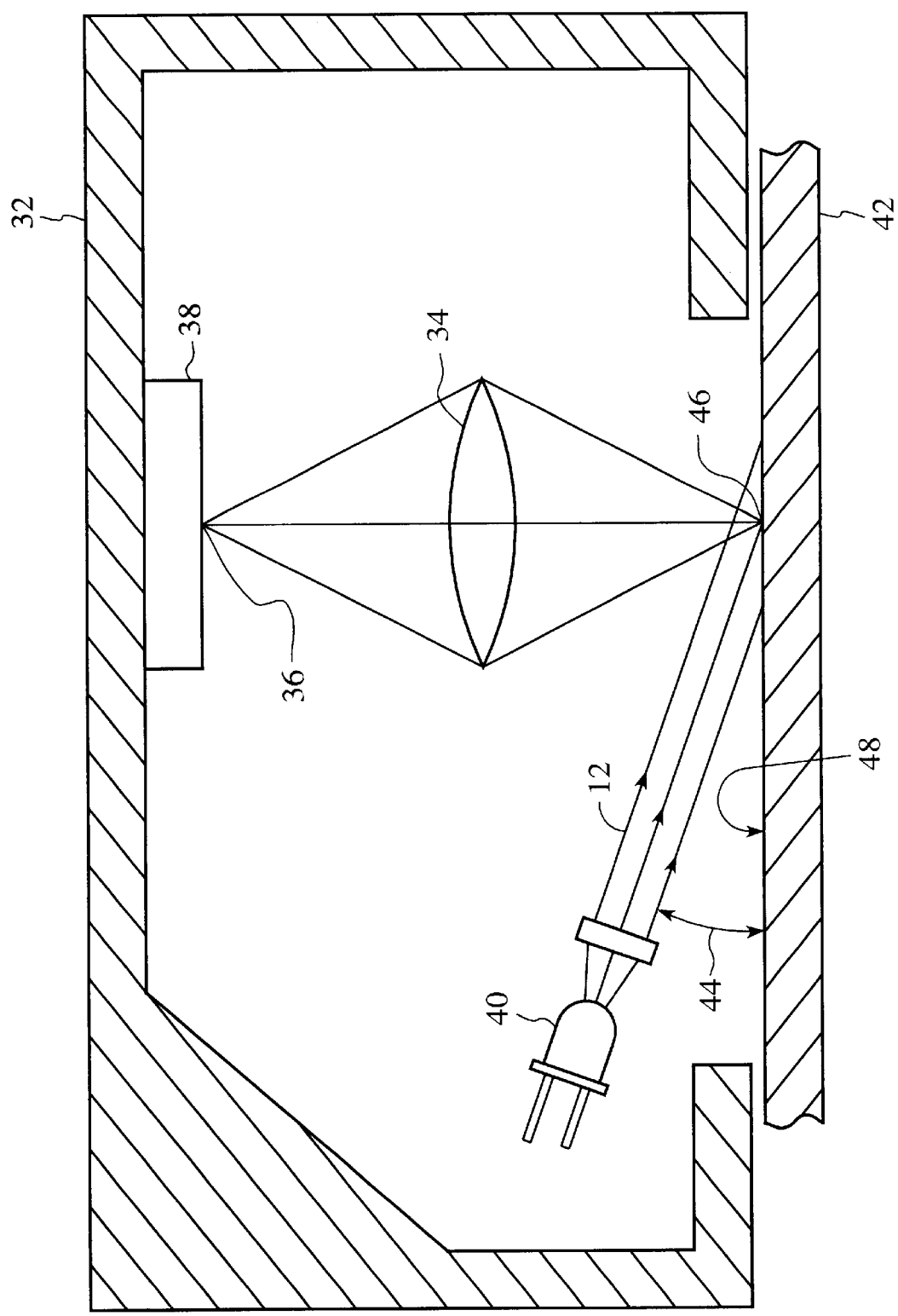
FIG. 4 is a front view of a typical sensor device arrangement.
Figure 5:
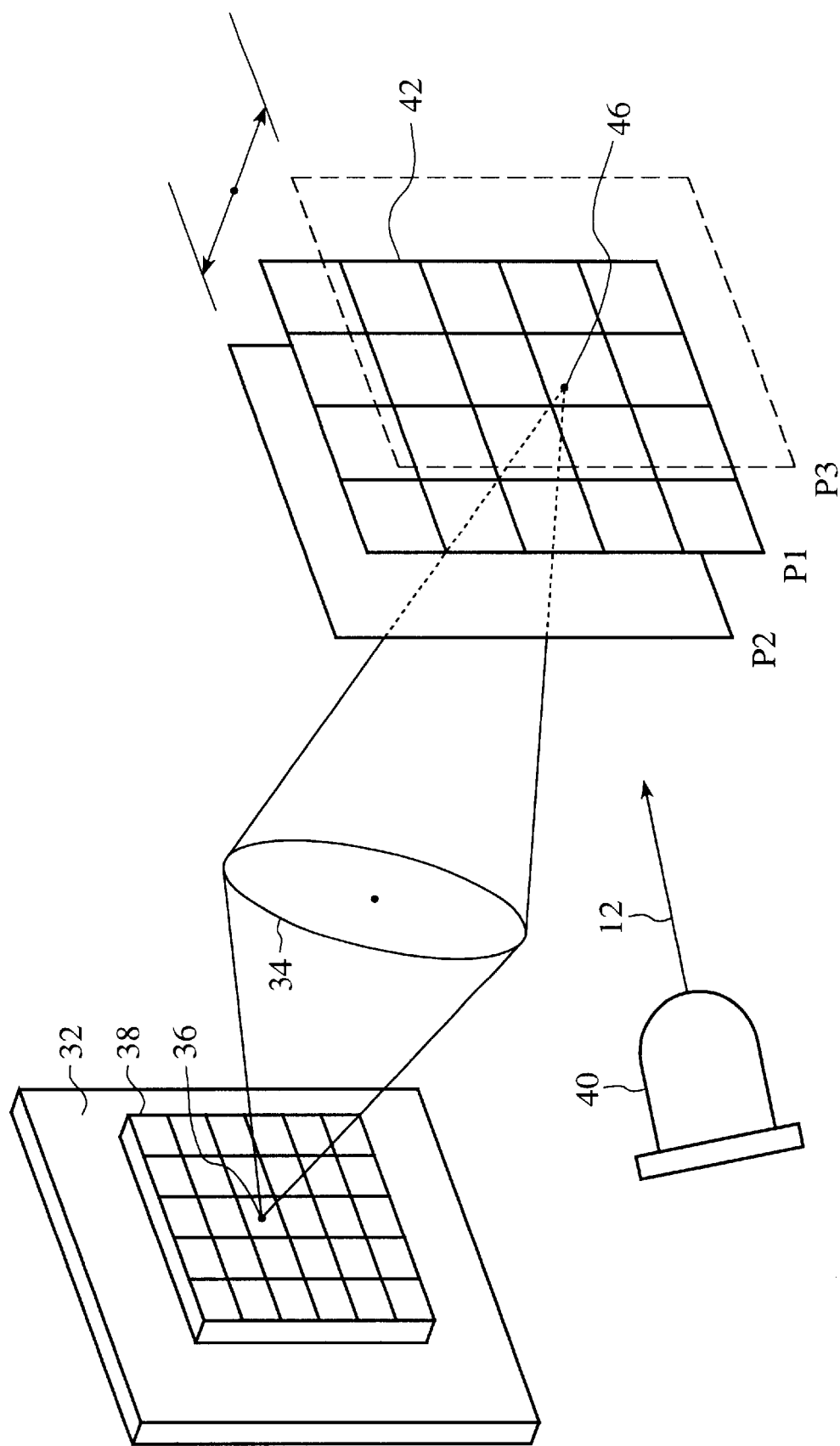
FIG. 5 is a perspective view of a typical sensor device arrangement showing three positions of the object of interest.

The typical sensing device consists of an illumination source, imaging optics, and a sensor array. The typical arrangement of the elements is depicted in FIGS. 4 and 5. The sensor device is usually secured to what is referred to as the first object 32. The first object may be, for instance, part of a robotic arm or a hand scanner. As well, the first object may contain processing electronics and other structural features. The imaging optics 34 are attached such that one focal surface 46 of the imaging optics is coincident with a portion of the object of interest 42 at contact and the other focal surface 36 is at the sensor array 38. The illumination source 40 is located such that the light can impact the object of interest 42, also known as the second object, at the desired angle. The illumination source may be fixed or it may be movable so that the angle of incidence 44 can be adjusted as needed. The object of interest, or second object, may move further away or closer to the sensor device depending on the particular application, but in touch applications the object of interest 42, or second object, would come into contact with portions of the first object, along a plane of contact 48, when becoming coincident with the focal surface 46.

Proximity is a measurement of distance between two objects. In this context, the second object, or the object of interest, is the object that is being sensed. The first object is the object that has the sensor device fixed to it. The first object, therefore, determines the proximity to the second object, i.e. the object of interest.

Figure 6:
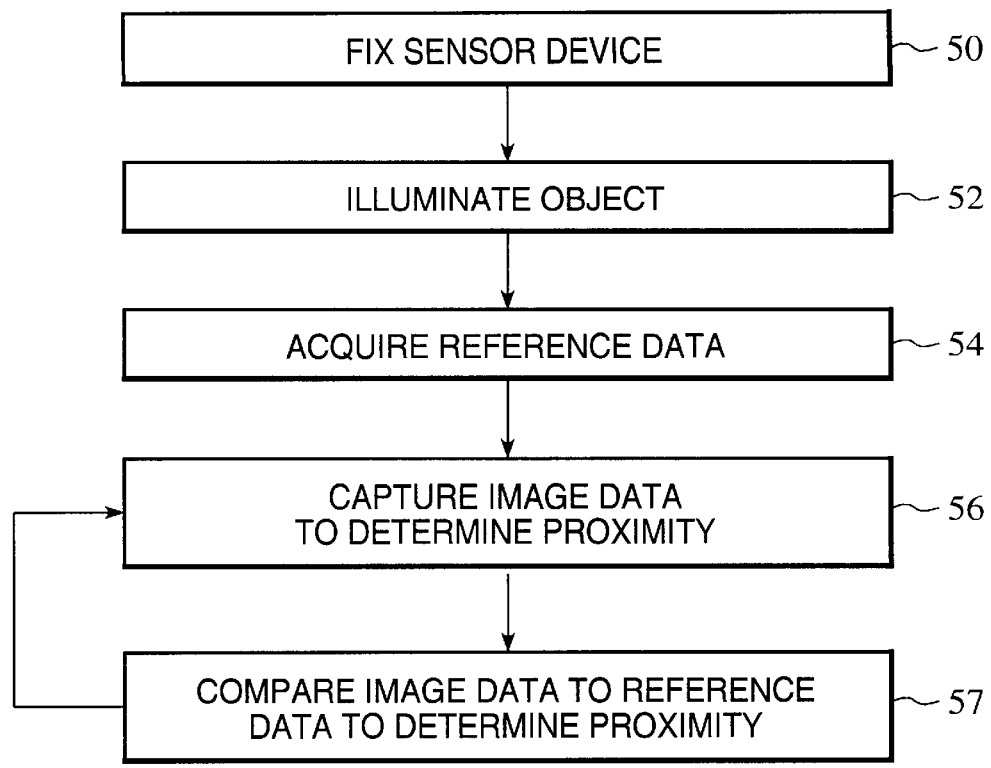
FIG. 6 is an operational view of the proximity determination method steps.

As depicted in FIG. 6, the first steps in determining proximity information are to fix a sensor device 50 to the first object and to illuminate 52 the object of interest. The next step in determining proximity information is to acquire reference data 54. Reference data may also be referred to as calibration data. Reference data is typically a distribution of light intensity that is emitted, reflected, or scattered from an object of interest. Reference data will have an image resolution that corresponds to a position relative to the focal position of the imaging optics. Typically, reference data is established by acquiring image data at the focal position of the imaging optics, although reference data can be taken over a range of positions away from the focal position, if more accurate determination of distance from the focal position is desired.

Figure 2:
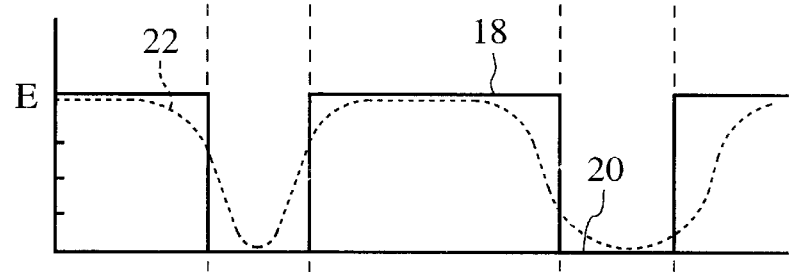
FIG. 2 is a depiction of the light energy emitted from the object in FIG. 1 while the object is in focus with imaging optics.
Figure 3:
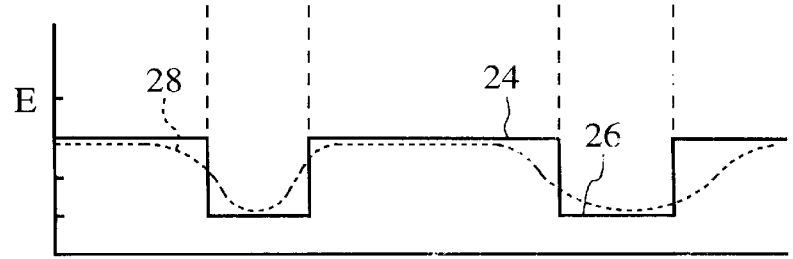
FIG. 3 is a depiction of the light energy emitted from the object in FIG. 1 while the object is out of focus with imaging optics.

FIG. 1 represents light 12 impacting the structural features 14 of an object of interest 16. FIG. 2 represents light energy distribution when the object of interest is in focus with the imaging optics, 18 represents light energy where light impacts structural features of the object of interest and 20 represents light energy of shadow areas where no light impacts the object of interest. These representations of light and dark resemble a condition of no light refraction or dispersion. Line 22 represents more realistically what the light energy transition may look like with refraction or dispersion. FIG. 3 represents the same object of interest under the same light conditions but the object of interest is out of focus with the imaging optics. Again, 24 represents the light energy where light impacts structural features of the object of interest. As well, 26 represents light energy of shadow areas and 28 represents more realistically the light energy transition between light and dark. Light distributions similar to those in FIG. 2 are also obtained even without structural features when the surface of the object of interest includes spatial variations of index of refraction, absorption, color, printing, or other optical features.

Referring to FIGS. 2 and 3, at the focal position, the range of light power intensities 18 and 20 that are delivered to the sensor array through the imaging optics is greatest, and the light power transitions 22 and 28 are more distinguishable than when outside the focal position. That is, the range of intensity of light power delivered to the sensor array while the object of interest is in focus 18 and 20 is higher than the range of intensity 24 and 26 of light power from the same point delivered to the sensor array while the object of interest is out of focus. As well, while the sensor is out of focus, areas of shadow on an object surface give the appearance to the sensor array that light is present 26.

Although the reference data is typically taken at the focal position, reference data may be taken at a different position. In addition, reference data may be developed for each individual object of interest, such as each payload. Or, reference data may be developed from a series of measurements from different objects to develop a reference data standard based on more than one object. For example, multiple pieces of a certain type of paper may be used to establish reference data for a hand scanning device.

Capturing image data from the object of interest is the next step to determine the proximity 56 of the object of interest relative to the first object. The image data is a function of the light contrast on the object of interest and the imaging resolution in transforming the light contrast to a photosensor array signal. The resolution of capturing an image of the light contrast is determined by the location of the object of interest relative to the focal position of the imaging optics. For example, referring to FIG. 5, if the object of interest 42 is at the focal position P1 of the imaging optics 34, the sensor array 38 will detect the light contrast with high resolution 18 and 20 and the light power distribution 22 is more distinguishable. If the object of interest 42 is at P3 further away from the focal position 46 of the imaging optics 34, then the sensor array detects the light contrast 24 and 26 with lower resolution and, as a result, it is harder to distinguish the light contrast that is present 28. Likewise, if the object of interest is at P2 closer to the imaging lens than the focal point, then the sensor array detects the light contrast with lower resolution.

Just as with the reference data, the high intensity signals 18 form captured image data that represent the areas on the object that are exposed to light, but these will appear to the sensor array as relatively lower intensity signals 24 when the object of interest is not in focus, FIG. 3. As well, the low intensity signals on the sensor that represent shadow areas 20 and 26 on the object, relative to their values at the in-focus position, will appear as higher intensity signals. The overall effect is that the signal transitions from light to dark areas measured by the sensor array are not as distinguishable.

Once the reference data and the image data have been developed, the sensor can determine the relative position of the object of interest relative to the first object. The position of the object of interest is determined by comparing 57 the contrasts of the captured image data to the reference data. Comparison of the data consists of mathematical calculations which compare the known reference data to the image data. In the preferred embodiment, the mathematical calculations may include using a Fourier transform to compare image data to the reference data.

If reference data is based on the focal position of the imaging optics, then the reference distance is known from the focal distance and the light power contrasts at the focal distance are known. The captured image data of the object of interest is then compared to the known light power contrasts at the focal position. Differences in light power contrasts are then correlated to the known focal distance to determine the relative position of the object of interest relative to the focal position, and thereby to the first object. From successive position calculations, as depicted by the return line from step 57 to step 56 in FIG. 6, the rate of approach or separation of the first and second objects relative to each other can be determined.

To determine the lateral movement of the object of interest relative to a first object, a sequence of at least two image data frames must be captured by the sensor device. The sequence of image data that is captured may be the same image data that is captured for the proximity determination or it may be separate data. In proximity determination, the resolution of the image received by the sensor is a key mechanism to determining proximity. But for lateral movement sensing, the light contrast on the object of interest is the key mechanism and the degree of focus should be constant.

Figure 7:
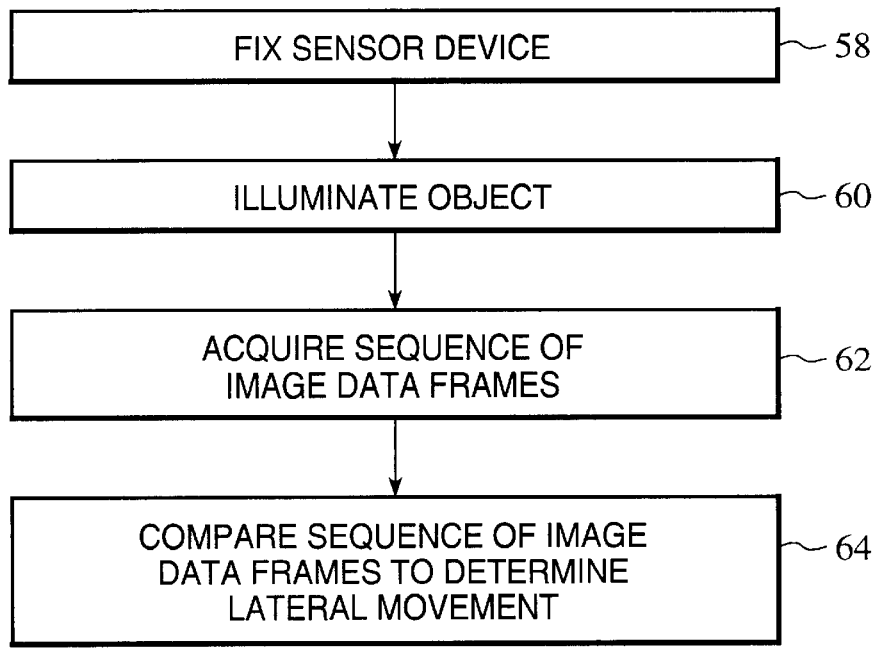
FIG. 7 is an operational view of the lateral movement method steps.

FIG. 7 represents the general steps for determining lateral movement. The first steps in determining lateral movement are to fix a sensor device 58 to the first object and to illuminate 60 the object of interest. The next step in determining lateral movement is to acquire a sequence of image data frames 62. Next, discrete frames of the image data sequence are compared to each other to determine relative lateral movement 64.

Figure 8:
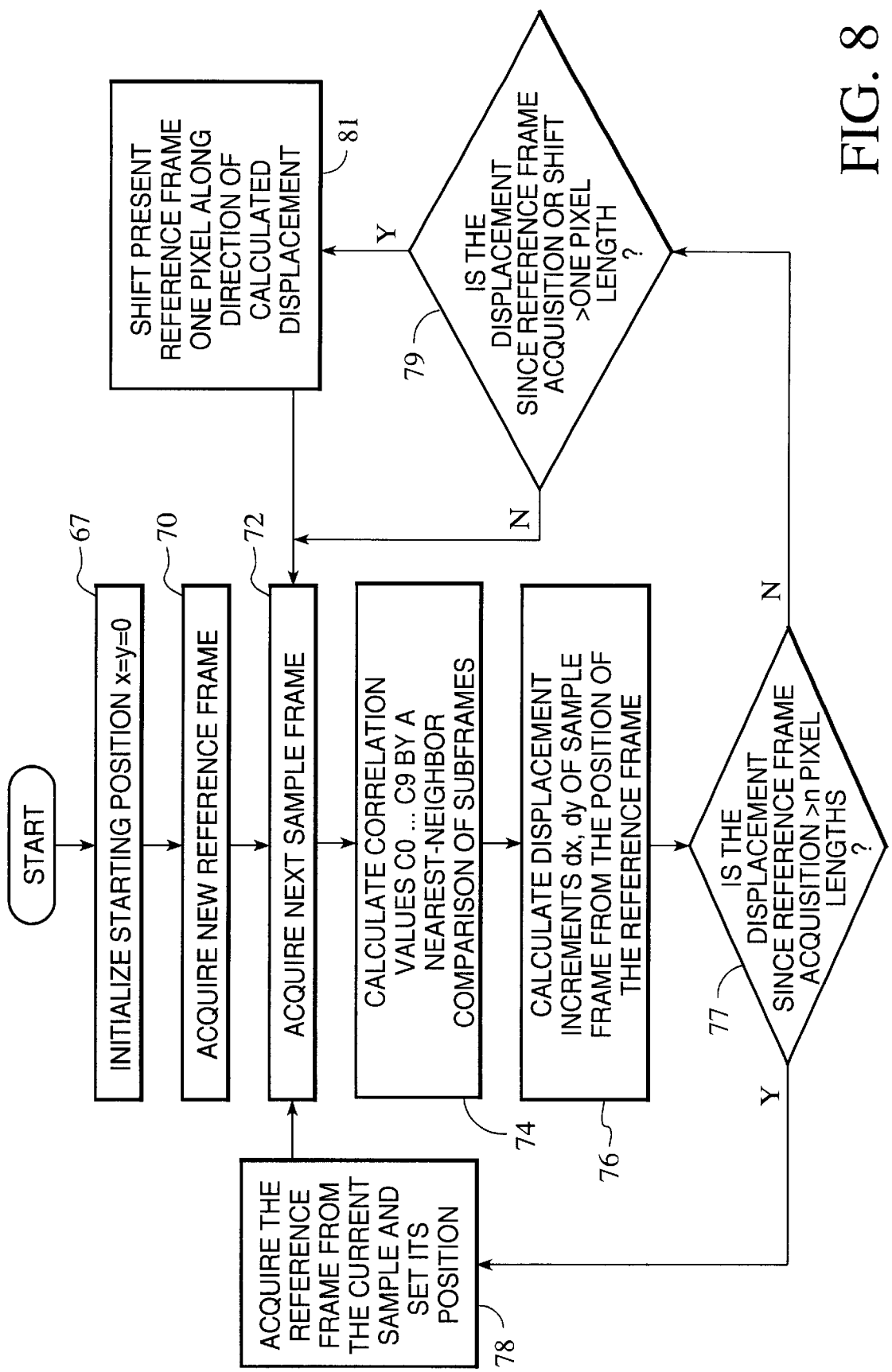
FIG. 8 is an operational view of one embodiment of lateral movement processing.

As an example, FIG. 8 represents the steps involved in lateral movement determination in hand scanning. Lateral movement determination in this embodiment includes correlating successive frames of image data. The correlations compare the positions of unique structural features in a sequence of image frames to provide information related to the position of a second object relative to a first object at a particular time. In steps 67 and 70, the starting position is initialized with x=y=0 and a reference frame is acquired using the sensor device that corresponds to a position of the object of interest. In effect, the reference frame is a start position with the x and y coordinates set at 0. Next, a sample frame is acquired 72 that corresponds to the object of interest at a later time. The later time is usually an interval that is short enough to allow the image to move no more than one pixel per time interval, to reduce the necessary search space and maximize response time.

Comparing the position of unique light contrast patterns in the reference frame to the position of the same light contrast patterns in the sample frame gives an indication of relative movement between the object of interest and the first object. Comparing the reference frame to the sample frame is accomplished by first utilizing the reference frame to establish a series of templates that indicate nine possible directions of movement that the reference frame could make, including no movement at all. The count of nine positions is a result of using a rectangular array geometry such that an image feature in one frame could feasibly move to any of its nearest neighbor positions or not at all. In step 74, a subframe of the sample frame is compared to each of these templates and correlation values are calculated. The correlation values represent the degree of similarity between each template and the subframe of the sample frame. The highest degree of correlation between the series of templates and the sample frame gives the indication of relative movement between the object of interest and the first object. Alternatively, templates of the sample frame could be compared to a surface of the reference frame.

The correlation process is described in more detail below and is described in U.S. Pat. No. 5,578,813 and U.S. patent application Ser. No. 08/591,847, both of which are assigned to the assignee of the present invention.

In the hand scanning embodiment, the initial reference frame may be acquired upon initiation of the sensing operation. The acquisition of reference data may be triggered by mere placement of the scanning device into contact with the object of interest. Alternatively, the scanning device may include a start button that initiates acquisition of reference data and image data.

Figure 9:
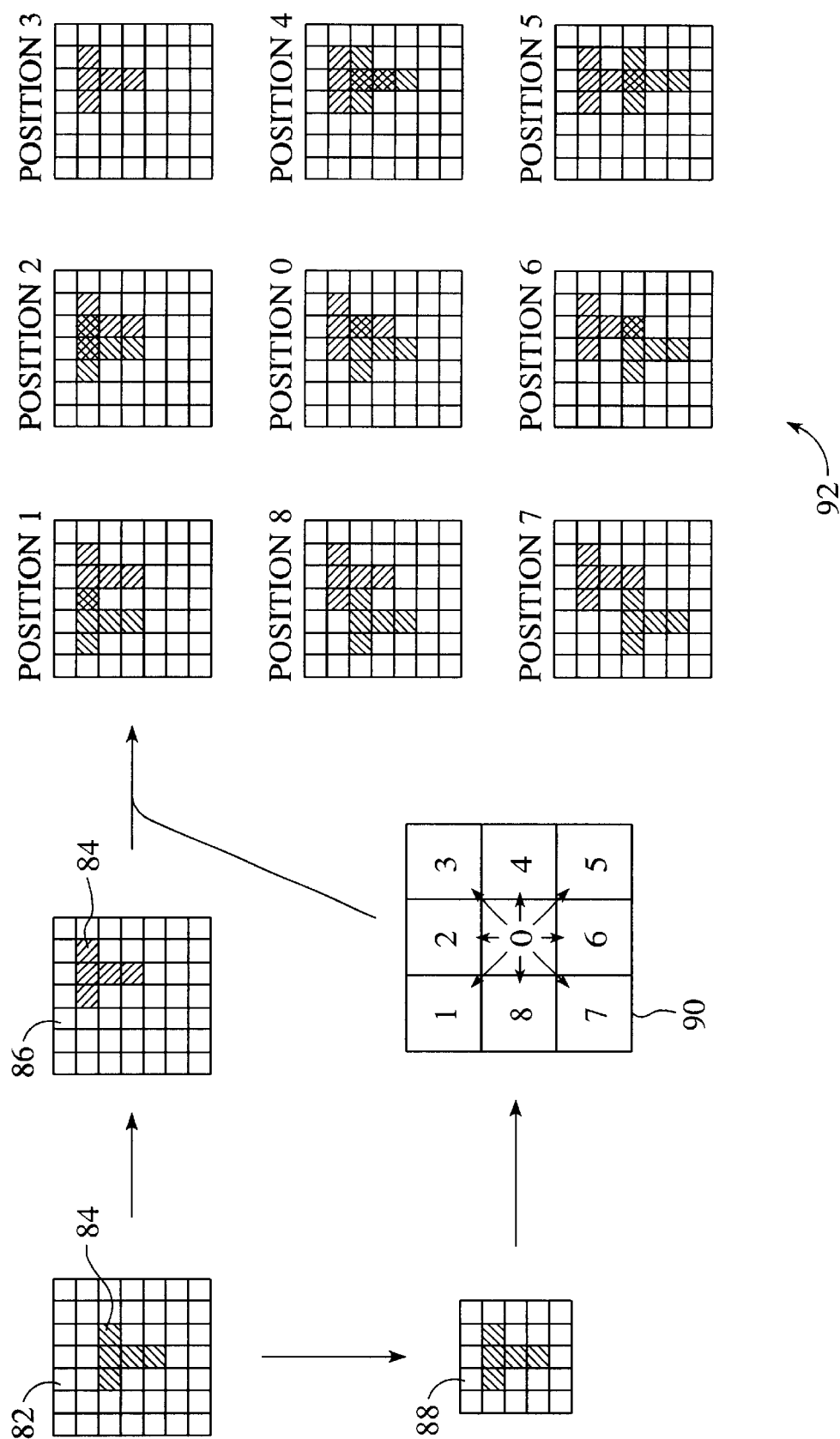
FIG. 9 is a schematical view of a correlation process.

The lateral movement processing is performed computationally and an example of what the computation represents is described below. The sensor device effectively observes an image that is moving laterally relative to the sensor device and produces an indication of the displacement in two lateral planar dimensions between successive observations. Referring to FIGS. 8 and 9, a reference frame 82 is shown as having an image of a T-shaped unique structural feature 84. The size of the reference frame depends upon factors such as the maximum scanning speed of the scanning device, the spatial frequencies in the imaging of the structural or printed features of the document, and the image resolution of the sensor. A practical size of the reference frame for a movement sensor that is thirty-two pixels (N) by sixty-four pixels (M) is 24 by 56 pixels. At a later time (dt), a sensor acquires a sample frame 86 which is displaced with respect to frame 82, but which shows substantially the same unique structural features except perhaps near the edges of the frame. The duration dt is preferably set such that the relative displacement of the T-shaped feature 84 is less than one pixel of the navigation sensor at the velocity of translation of the scanning device. An acceptable time period is 50 microseconds for velocities of 0.45 meters/sec at resolutions of 12 line-pairs per millimeter.

If the scanning device has moved during the time period between acquiring 70 the reference frame 82 and acquiring 72 the sample frame 86, the first and second images of the T-shaped feature will be ones in which the feature has shifted. While the preferred embodiment is one in which dt is less than the time that allows a full-pixel movement, the schematic representation of FIG. 9 is one in which the feature 84 is allowed to shift up and to the right by one pixel. The full-pixel shift is assumed only to simplify the representation.

Element 90 in FIG. 9 represents a sequential shifting of the pixel values of subframe 88 in each of the eight nearest-neighbor pixel positions. A ninth position is represented by a null shift. That is, step "0" does not include a shift, step "1" is a diagonal shift upward and to the left, step "2" is an upward shift, etc. In this manner, the nine pixel-shifted frames or templates can be combined with the sample frame 86 to produce the array 92 of position frames. The position frame designated as "Position 0" does not include a shift, so that the result is merely a combination of frames 86 and 88. "Position 3" has the minimum number of shaded pixels or where the differences between overlying pixels are minimum, and therefore is the frame with the highest correlation. Based upon the correlation results, the position of the T-shaped feature 84 in the sample frame 86 is determined to be a diagonal rightward and upward shift relative to the position of the same feature in earlier-acquired reference frame 82, which implies that the scanning device has moved leftwardly and downwardly during time dt.

Different correlation approaches may be employed. One acceptable approach is a "sum of the squared differences" correlation. For the embodiment of FIG. 9, there are nine correlation coefficients (Ck=C0, C1 ... C8) formed from the nine offsets at element 90, with the correlation coefficients being determined by equation:

$$C_k = \sum_i \sum_j (S_{ij} - R_{(ij)+k})^2$$

where $S_{ij}$ denotes the sensor-measured value at the position ij of the sample frame 86 and $R_{ij}$ denotes the sensor-measured value at the frame 88 as shifted at the element 90 in the k direction, with k being the identifier of the shift at element 90. In FIG. 9 k=3 provides the correlation coefficient with the lowest value.

In the more general case, the displacement of two successive frames will be small enough that it does not create a minimum correlation coefficient at one of the eight outer template positions. In this case, it may be necessary to interpolate a sub-pixel displacement value. This can be done by calculating a "quadratic plus cross-terms" fit to the nine sums of square differences calculated above. The nine correlation values represent possible displacements in the eight compass directions and a null displacement. The true displacement is determined by calculating the position of the minimum value of the smooth regressively fit mathematical surface.

In step 76 of FIG. 8, the correlation values calculated in step 74 are used to find the locations of identical features in successive frames in order to determine the displacements (dx, dy) of the features from frame-to-frame. Summing or integrating these displacements and correcting for scale factors introduced through the design of the relevant optics determine the displacements of the imaging sensor as a scanning procedure progresses.

While the process provides a high degree of correlation match, any errors that do occur will accumulate if the step 76 of calculating the correlation values is automatically and continuously followed by a step of shifting the present sample frame 86 to the reference frame designation. In order to place a restriction on the growth rate of "random walk" error, the shifting of a sample frame, to be a new reference frame for a subsequent series of correlation computations, can be performed less often. The object displacement between the less frequently shifted new reference frames is referred to as a "macrostep."

At step 77 of FIG. 8, the determination is made as to whether the stored sample frame should become the new reference frame for the subsequent series of correlation computations. If the accumulated displacement since acquisition of a reference frame at either step 70 or step 78 exceeds a predetermined number (n) of pixel lengths, the sample frame is substituted as the new reference frame at step 78. The new reference frame and the next sample frame acquired at step 72 are then used in implementing steps 74 and 76. On the other hand, if the displacement is determined to be less than n pixel lengths at step 77, a second pixel length determination occurs at step 79. A displacement of less than one pixel length since the last reference frame acquisition (at step 70 or step 78) or shift (at step 81) of a reference frame allows the process to return without effect on the reference frame to the step 72 of acquiring the next sample frame. However, if the displacement is greater than one pixel (but less than n pixels), the present reference frame is shifted at step 81 in the direction of the calculated displacement. For example, in FIG. 9 the calculated displacement is one pixel length upward and to the right, as seen by comparing the present reference frame 82 to the sample frame 86. Thus, the shift at step 81 will be upward and to the right.

As an example of the implementation of steps 77, 78, 79 and 81 of FIG. 8, it will be assumed that the predetermined limit on the displacement that can occur before a new reference frame is established at step 78 is four pixel lengths. That is, n=4 in step 77. After each calculation of a displacement increment at step 76, it is determined whether the accumulated displacement increments exceed four pixel lengths. If the accumulated displacement is less than four pixel lengths, step 79 determines whether the displacement is greater than one pixel length since the last shift of the present reference frame at step 81 or the last acquisition of a reference frame at step 70 or step 78. A "no" determination at step 79 returns the process to step 72 without affect on the reference frame. A "yes" determination will result in a shift of the reference frame in step 81 in the direction of the calculated displacement. Following the shift at step 81, a next sample frame is acquired at step 72, and the shifted reference frame and the sample frame are used in the nearest-neighbor comparison at step 74. After a number of shifts of the present reference frame, the determination at step 77 will eventually lead to a "yes" determination. As a result, the current sample frame becomes the new reference frame at step 78, and the process continues.

The sampling period dt does not have to be constant. The sampling period may be determined as a function of previous measurements. One method that employs a variable dt is to improve the accuracy of displacement calculation by keeping the relative displacement between successive reference frames within certain bounds. For example, the upper bound may be one-pixel displacement, while the lower bound is determined by numerical roundoff considerations in the processing of the navigation data.

This same method for determining lateral movement of a scanning device relative to a surface or document such as a piece of paper can be applied to other embodiments. Some examples include a robotic arm, automated handling equipment, a computer mouse, and a scanner on/off controller.

Figure 10:
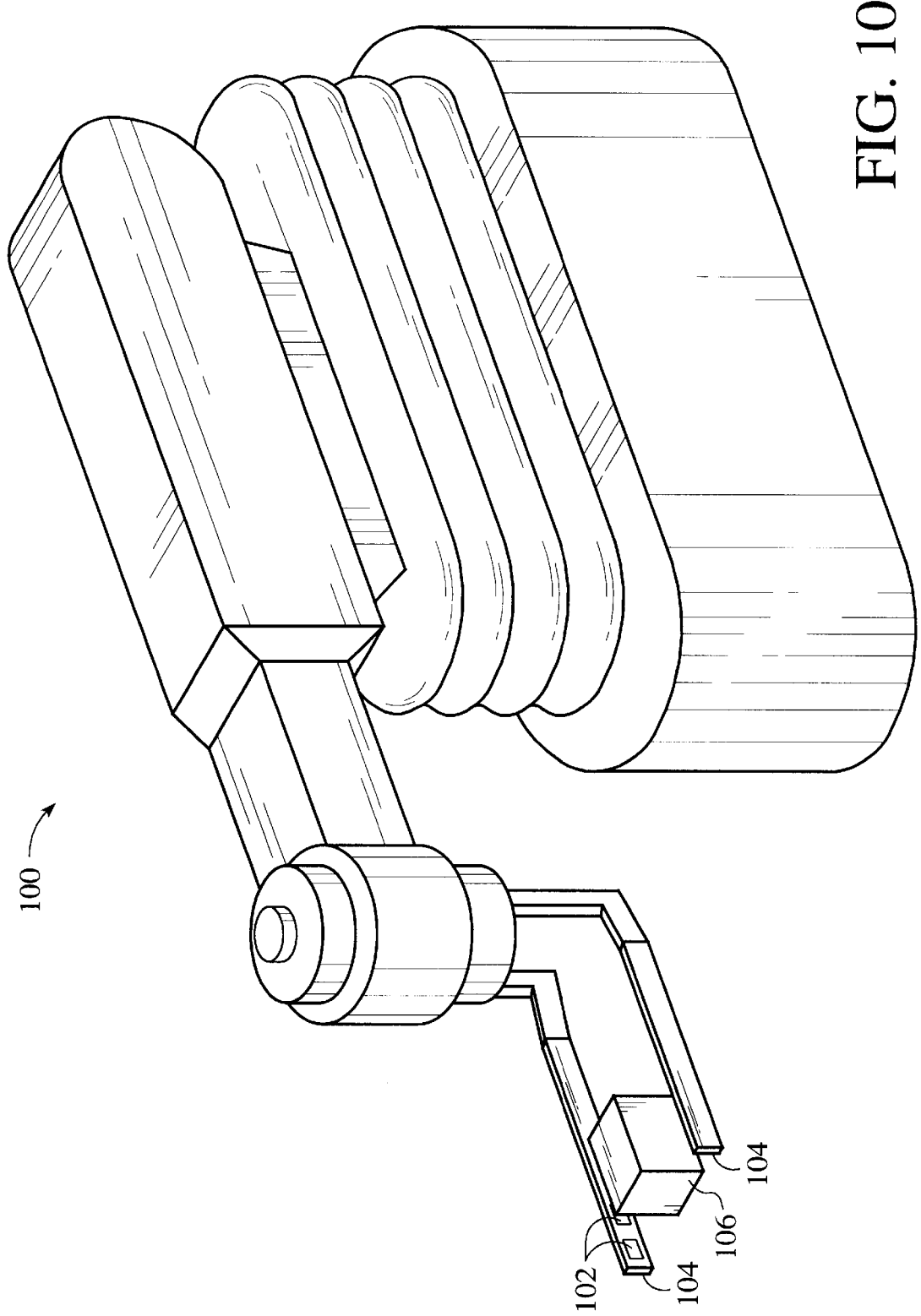
FIG. 10 is a perspective view of a robotic arm engaging a payload.

As applied to a robotic arm, the invention can operate in different ways. As depicted in FIG. 10, at least one sensor device 102 is fixed to end-effectors 104 or "fingers" of a robotic arm 100. As the fingers and arm attempt to grab a payload 106, the proximity determination mode of the sensor device guides the robotic arm and end-effectors towards contact with the payload. Other known means may be used to guide the arm to within the working range of the invention, but as the end-effectors approach the payload, the sensor device creates light contrast on the surface of the payload. Utilizing the method described above, the sensor device determines the relative distance of the sensor device, and thus the end-effectors, to the payload. The relative distance is calculated continually at time intervals that can be in the millisecond or microsecond range. Utilizing the change in relative distance traveled per period of time, the rate of approach can easily be determined. The rate of approach may be precisely adjusted as the end-effectors near and eventually contact the payload. Upon contact, the end-effectors grab the payload with sufficient force to perform the desired operations.

The sensor or sensor devices are located on the end-effectors such that the sensor devices can illuminate the surface of the payload when the payload is engaged by the end-effectors. As a result, the lateral movement sensor may sense light contrast on the surface of the payload to monitor for any movement between the end-effectors and the payload. Movement between the end-effectors and the payload may indicate that the payload is not securely held by the end-effectors and is effectively "slipping" through the robot's fingers. To control slippage, the robotic arm is programmed to adjust the force of its grip in response to relative movement between the end-effectors and the payload after contact is made. For example, if the robotic arm is holding a payload and the payload starts to slip, the sensor device will detect the relative movement and adjust the grip pressure as needed to control the slip.

The lateral movement and proximity detection may also be used to release the payload and separate the end-effectors from the payload. Also, by employing more than one sensor to measure slippage amounts and rates at different points of contact between end-effectors and a payload, gravity can be usefully employed to help move and rotate the payload in different directions.

Figure 11:
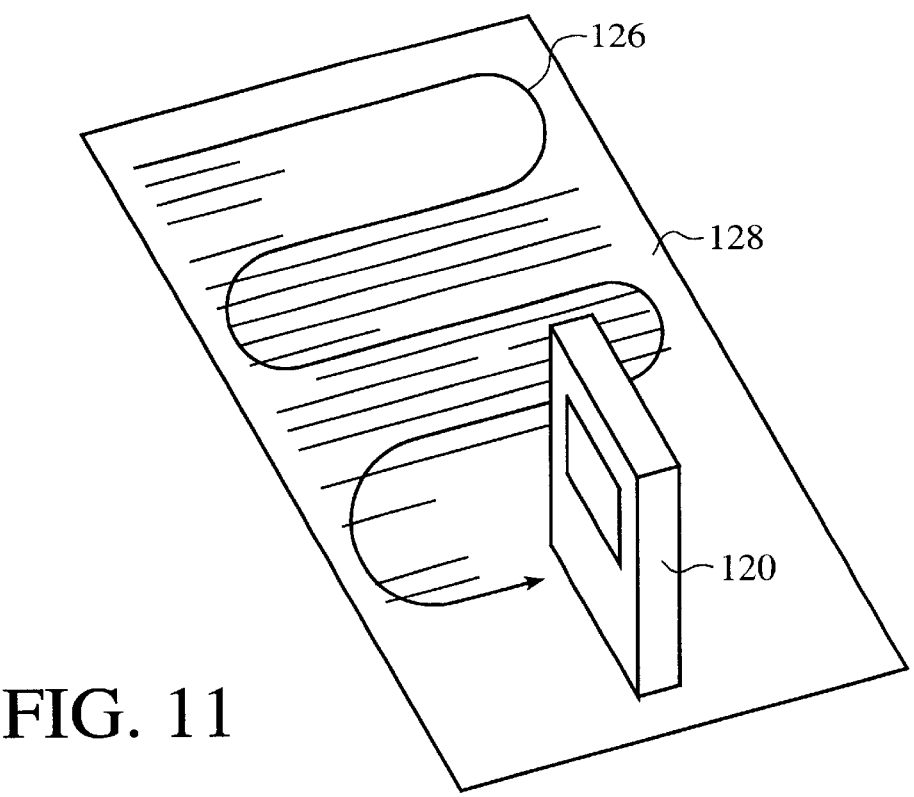
FIG. 11 is a perspective view of a hand-held scanning device following a meandering path on a document.
Figure 12:
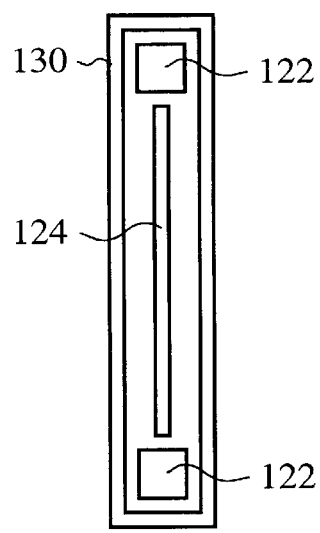
FIG. 12 is a rearward view of imaging and position sensors of the scanning device.

In another embodiment, the invention may be used to activate or deactivate certain operations in a hand scanner. For example, the invention may be used as an ON/OFF controller in a hand scanner. FIGS. 11 and 12 represent a hand scanning device and operation. In operation, the hand scanner 120 is swept 126 across a document 128 to scan a particular image. The scanning end 130 of the hand scanning device includes two sensor devices 122 for detecting proximity and lateral movement and one long scanning device 124 for scanning the desired image.

As an ON/OFF controller, the two sensor devices, in a "powered down" mode, periodically pulse their illumination systems searching for the presence of a surface. The sensors will only power up if or when sufficient conditions are present. Sufficient conditions are present when the proximity function of the sensor device detects sufficient contrast in the image of a nearby surface. For example, if the hand scanner is on a desk lying on its side in a powered down state, when the sensors pulse the illumination systems, the sensors may not see any significant contrast or patterns characteristic of an image. If the only object in the path of the sensors is a distant computer on the desk or a wall on the other side of the room, the sensors will not recognize sufficient contrast and will not turn on. On the other hand, if the hand scanner is placed into position on a document, when the sensors pulse their illumination systems, they will sense sufficient contrast and will come into full operation and direct the hand scanner to power up. The reverse process is used for powering down a hand scanner. Once the sensor device does not sense sufficient contrast, it turns off the hand scanner and goes into the periodic illumination mode. Also, if the sensor device does not detect sufficient lateral motion over a given period of time, it can shut down a hand scanner. These shut-down features can prevent excessive loss of battery power when a scanner is not in use but the manual power switch has been left turned on or inadvertently turned on while stored in a briefcase.

The lateral movement sensor function can be used independently or in tandem with the proximity sensor function to achieve ON/OFF control. Used in tandem, the sensors and hand scanner are turned on any time there is sufficient contrast created by a document and there is an indication of lateral movement. Or the two functions can be used in tandem another way. When the proximity sensor determines that there is sufficient contrast, the hand scanner is elevated from a powered down mode to an idle mode. Once lateral movement is sensed, the scanner is switched from an idle mode into a full operation mode.

Used alone, as an ON/OFF controller, the lateral movement sensor function periodically pulses the illumination system and senses for lateral movement, turning on the sensors and scanner upon detection of sufficient lateral movement. As well, when sufficient lateral movement is not detected the sensors and hand scanner are put into an idle mode or turned off. The lateral movement sensor function can also be programmed to turn off the scanner when the scanner speed across a surface falls below or exceeds the specification limits of the scanner.

Another embodiment of the invention is in automated handling of delicate parts. For example, integrated circuits that must be handled with care can be handled by a system with proximity and lateral movement sensors. With the proper optics, sensor systems with high accuracies on the order of whole or fractions of a micron can be obtained. In an assembly line type operation where the proximity sensor mode is employed to handle multiple units of the same part, reference data can be established based on average structural or printed features and corresponding light contrast for a particular line of parts.

In other embodiments of the invention, the sensing of a gradient in resolution and/or contrast across a sensor array may be used to indicate tilt between the surface of the object of interest and the plane of best focus as sensed by the sensor array. Two sensor arrays displaced within the same object-sensing plane can be used to sense parallelism between the sensor contact plane and the contact surface of the object of interest. Additionally, lateral-motion sensing by two sensor arrays displaced within the same object-sensing plane can be used to sense relative rotation of the contact surface of the object of interest about a normal to the object-sensing plane.

What is claimed is:

1. A method for determining a position of a first object relative to a second object comprising the steps of:

fixing a sensor device to said second object, said sensor device having a sensor array and having imaging optics with a known focal length;

illuminating said first object to create light contrasts indicative of at least one of structural and printed features of said first object;

acquiring reference image data;

capturing image data of said first object utilizing said sensor device such that said image data is responsive to said light contrasts indicative of at least one of structural and printed features of said first object and such that said image data has a contrast that is dependent upon a position of said first object relative to said sensor device; and correlating using mathematical measures of correlation between contrasts in said reference image data with said captured image data to determine relative proximity information between said second object and said first object at a time of capturing said image data.

2. The method of claim 1 wherein said steps of acquiring reference image data and capturing image data include capturing a sequence of image data frames of said first object utilizing said sensor device such that each frame is responsive to said light contrasts indicative of at least one of structural and printed features of said first object and further comprising the step of comparing discrete frames from said sequence of frames to determine relative lateral movement information between said first object and said second object at a time of capturing said sequence.

3. The method of claim 1 further comprising a step of utilizing said relative proximity information to control approach to contact, movement away from contact, or actual contact between said second object and said first object.

4. The method of claim 3 wherein said step of fixing said sensor device is a step of attaching said sensor device to an end effector of a robot and said step of illuminating said first object is a step of directing light onto a payload.

5. The method of claim 2 further comprising a step of utilizing said relative lateral movement information to control or prevent slippage at the region of contact between said second object and said first object, wherein said first object is a payload and said second object is an end effector of a robot.

6. The method of claim 1 further comprising a step of utilizing said relative proximity information to activate and deactivate a scanner device.

7. The system of claim 1 further comprising:
means for acquiring a sequence of said frames; and
means for utilizing said sequence of frames to determine lateral position information.

8. The system of claim 7 wherein said second object is a robotic arm and wherein said sensor is attached to said robotic arm, said proximity information and said lateral movement information being utilized to control approach and release rates of said robotic arm and to control slip of said second object relative to said robotic arm.

9. The system of claim 7 wherein said second object is an image scanner and said first object is a document that is to be scanned and further comprising a switch that is responsive to one or both of said proximity information and lateral movement information wherein said switch can activate and deactivate said image scanner.

10. The method of claim 1 wherein said step of acquiring reference image data includes a step of acquiring reference image data having a first light contrast pattern and a first focus, and wherein said step of contrast comparing includes a step of mathematically comparing a portion of said light contrast pattern of said reference image data to a portion of a light contrast pattern of said captured image data, wherein both of said portions are related to a similar location on said first object.

11. The method of claim 10 wherein said step of correlating includes a step of correlating differences in light power ranges between said portions of said light contrast patterns of said reference image data and said captured image data.

12. The method of claim 1 wherein said step of acquiring reference image data includes a step of establishing said reference image data by imaging said first object when said first object is separated from said second object by said known focal length of said imaging optics.

13. The method of claim 1 further including a step of maintaining constant said known focal length of said imaging optics during said steps of acquiring, capturing, and correlating.

14. A position detection and control system for determining a position of a first object relative to a second object comprising:
a sensor attached to said second object that is responsive to a pattern of light contrast on said first object that is indicative of structural features of said first object, said sensor having a sensor array and imaging optics with a known focal length, wherein said sensor obtains frames of image data from said first object that corresponds to said pattern of light contrasts, each of said frames having a focus that is dependent upon a distance between said first and said second objects;
means for generating reference image data having a pattern of light contrast; and
means for correlating using mathematical measures of correlation between said patterns of light contrast of said frames of image data and said reference image data to calculate relative proximity information between said first object and said second object.

15. A method for determining a position of a first object relative to a second object comprising the steps of:
fixing a sensor device to said second object, said sensor device having a sensor array and having imaging optics with a known focal length;
illuminating said first object to create a contrast pattern indicative of structural features of said first object;
capturing a sequence of frames of image data from said first object utilizing said sensor device such that each frame has light power transitions that are responsive to said contrast pattern and that are indicative of a position of said first object relative to said sensor device;
comparing discrete frames from said sequence to determine relative lateral movement information between said first object and said second object;
acquiring reference image data having light power transitions that are indicative of a reference position of said first object relative to said second object; and
correlating using mathematical measures of correlation between light power transitions from at least one of said frames of image data to light power transitions from said reference image data to determine relative proximity information between said first object and said second object.

16. The method of claim 15 further comprising the step of utilizing said relative lateral movement information to control or prevent slippage at the region of contact between said first object and said second object, wherein said first object is a payload and said second object is an end effector of a robot.

17. The method of claim 15 further comprising the step of utilizing said relative lateral movement information to activate an electronic scanner.

18. The method of claim 15 further comprising the step of utilizing said relative proximity information to control approach to contact, movement away from contact, or actual contact between said first object and said second object.

19. The method of claim 15 wherein said step of fixing said sensor device is a step of attaching said sensor device to an end effector of a robot and said step of illuminating said fit object is a step of directing light onto a payload.

* * * * *